United States Patent
Kim et al.

(10) Patent No.: US 8,234,718 B2
(45) Date of Patent: Jul. 31, 2012

(54) METHOD AND APPARATUS FOR FORBIDDING USE OF DIGITAL CONTENT AGAINST COPY CONTROL INFORMATION

(75) Inventors: Bong-seon Kim, Seongnam-si (KR); Yong-kuk You, Seoul (KR); Chang-sup Ahn, Seoul (KR); So-young Lee, Suwon-si (KR); Ji-young Moon, Hwaseong-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1015 days.

(21) Appl. No.: 12/130,139

(22) Filed: May 30, 2008

(65) Prior Publication Data
US 2009/0037748 A1     Feb. 5, 2009

Related U.S. Application Data

(60) Provisional application No. 60/952,939, filed on Jul. 31, 2007.

(30) Foreign Application Priority Data

Sep. 13, 2007 (KR) .......................... 10-2007-0093256

(51) Int. Cl.
*G06F 21/00* (2006.01)
(52) U.S. Cl. ............... 726/31; 726/32; 726/33; 380/200; 380/201

(58) Field of Classification Search ............... 726/31–33
See application file for complete search history.

(56) References Cited

U.S. PATENT DOCUMENTS

| 7,506,367 | B1 * | 3/2009 | Ishibashi ........................ 726/10 |
| 2002/0141577 | A1 | 10/2002 | Ripley et al. |
| 2006/0156396 | A1 * | 7/2006 | Hochfield et al. ............... 726/20 |
| 2007/0050294 | A1 | 3/2007 | Trottier et al. |
| 2007/0091359 | A1 | 4/2007 | Suzuki et al. |

FOREIGN PATENT DOCUMENTS

| JP | 2000-98885 A | 4/2000 |
| KR | 10-2003-0088045 A | 11/2003 |
| KR | 10-2004-0060976 A | 7/2004 |
| KR | 10-2007-0037994 A | 4/2007 |

* cited by examiner

*Primary Examiner* — Kambiz Zand
*Assistant Examiner* — Imhotep Durham
(74) *Attorney, Agent, or Firm* — Sughrue Mion, PLLC

(57) ABSTRACT

Provided is a method of preventing digital content from being used despite the presence of copy control information. In the method, a security apparatus capable of restricting use of contents generates a nonce with respect to a storage device and stores the nonce in the storage device and a memory separated from the storage device when content is stored in the storage device; updates the nonces stored in the memory and storage device when movement of the content occurs; and permits use of the content only when the nonce of the storage device, which is stored in the memory, is equal to the nonce stored in the storage device if the content is requested for use, thereby preventing a disk cloning attack.

8 Claims, 7 Drawing Sheets

| HDD_ID | E(MK, HDD_Key) | E(MK, HDD_Nonce) |

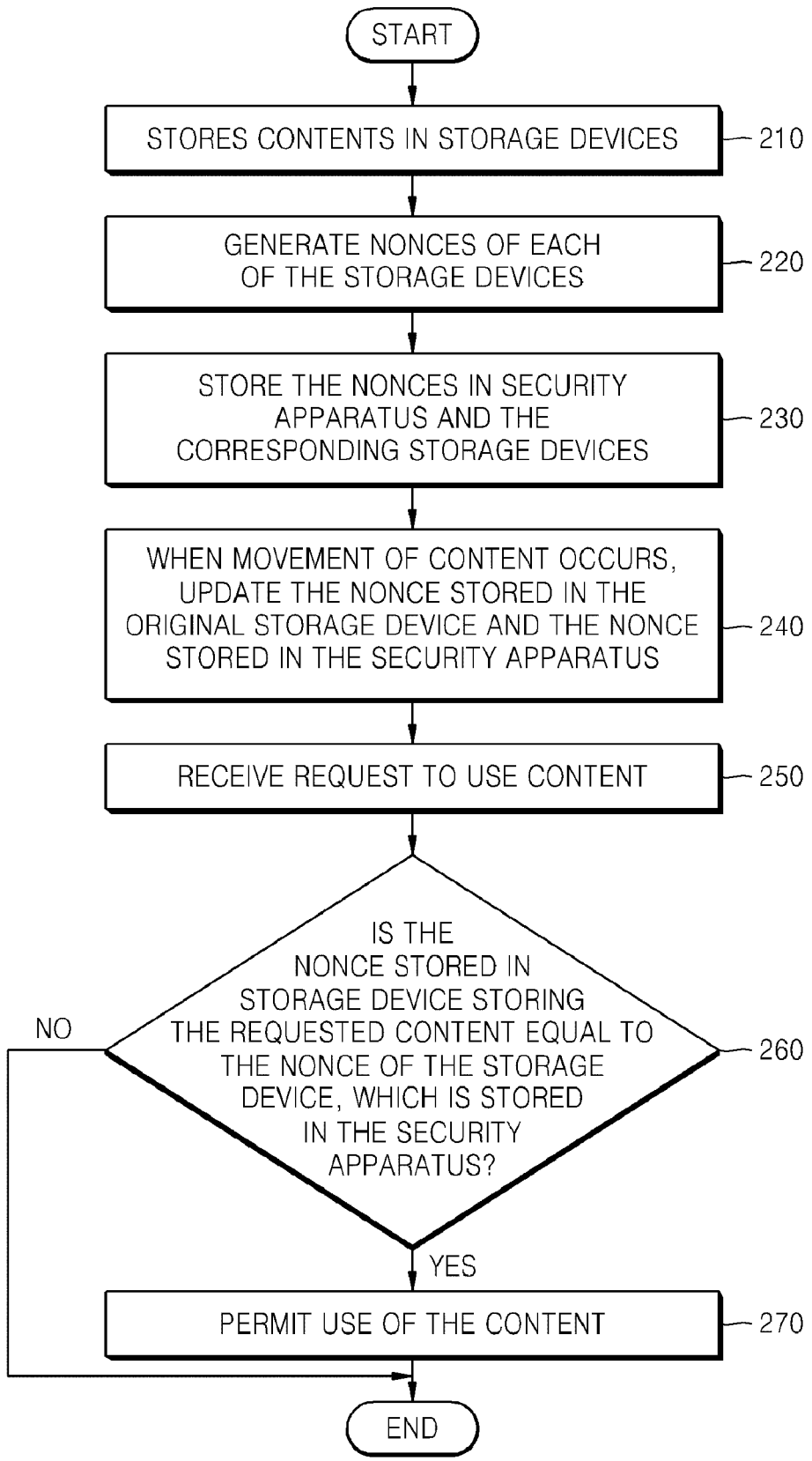

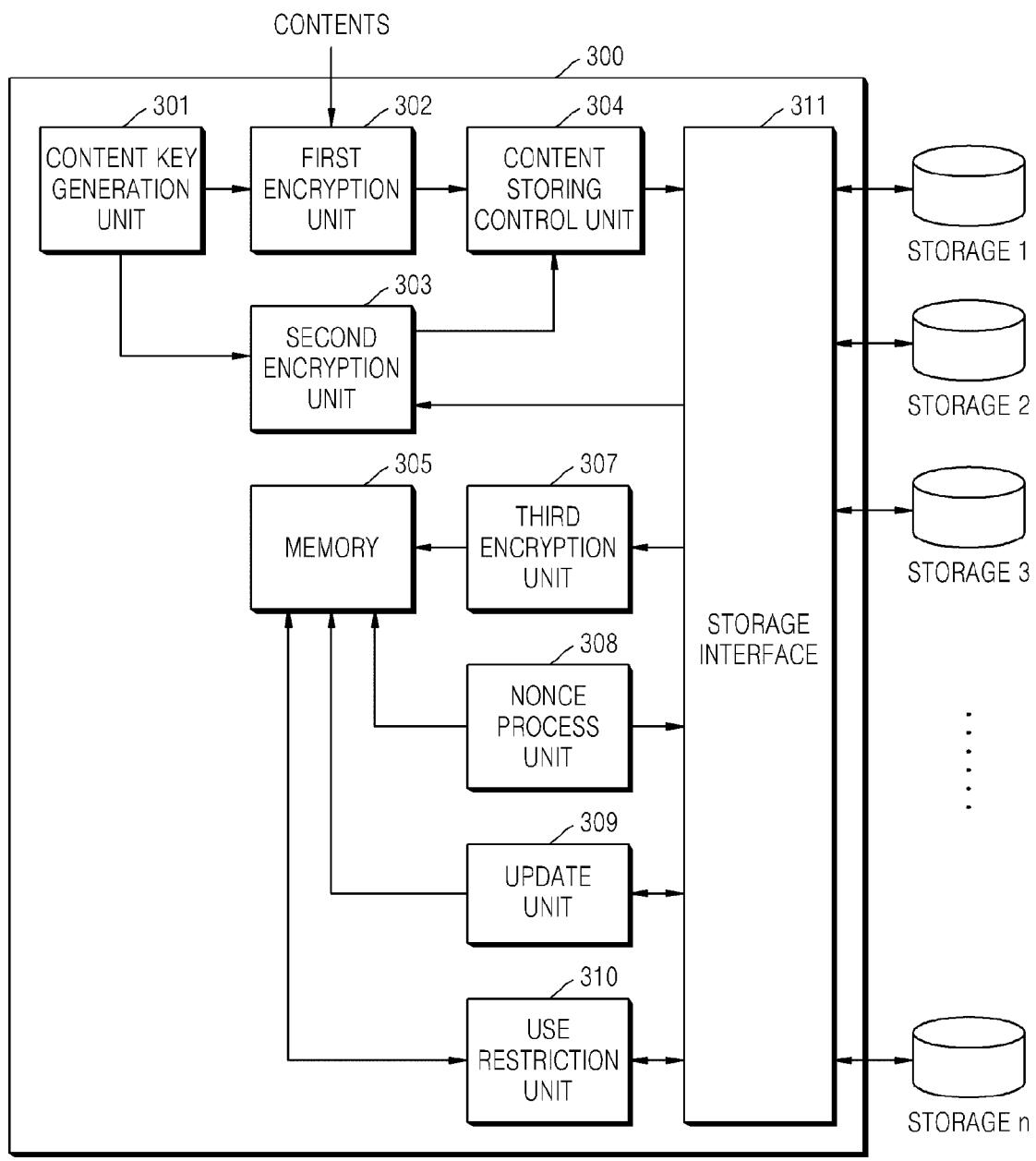

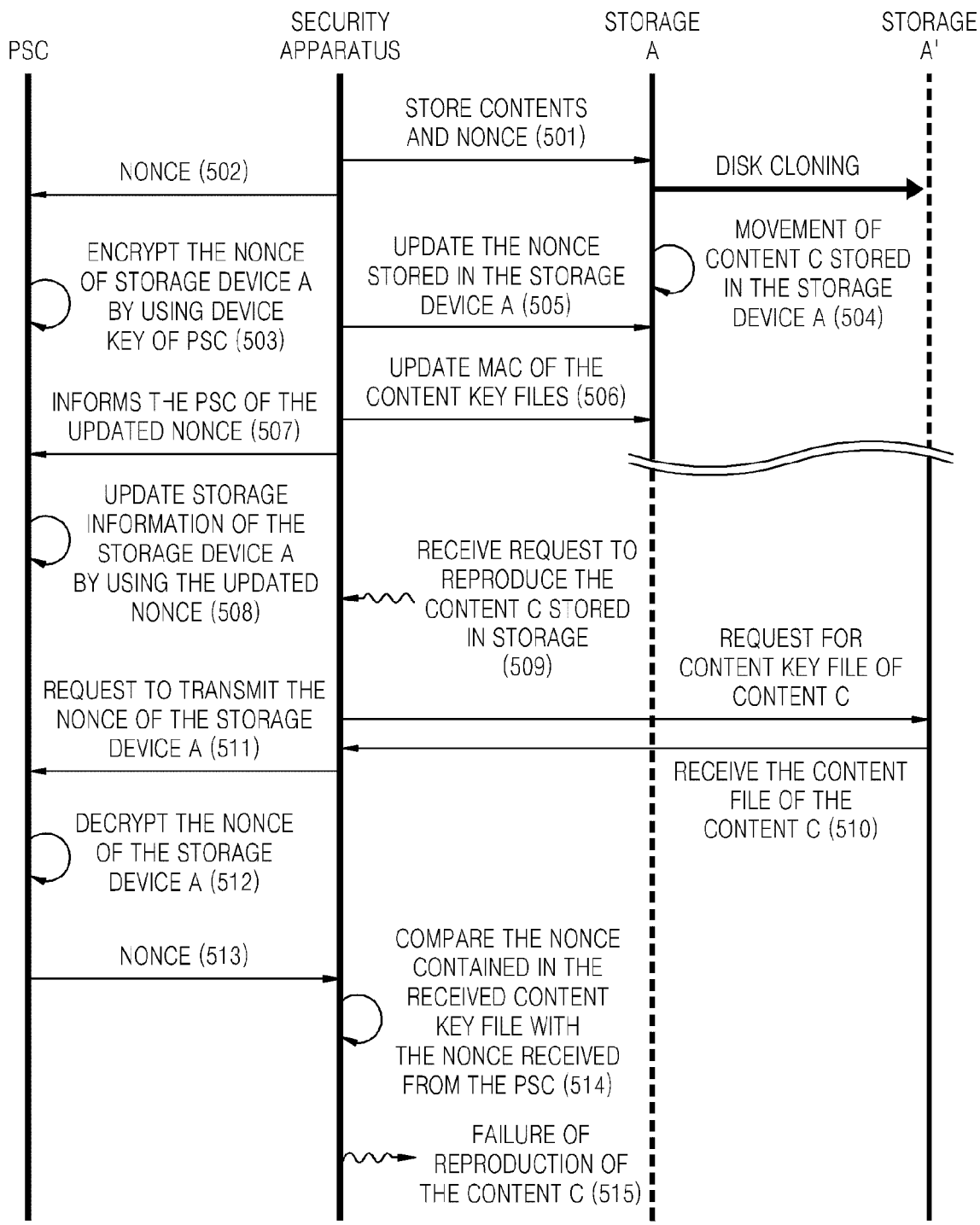

METHOD AND APPARATUS FOR FORBIDDING USE OF DIGITAL CONTENT AGAINST COPY CONTROL INFORMATION

CROSS-REFERENCE TO RELATED PATENT APPLICATIONS

This application claims priority from U.S. Provisional Application No. 60/952,939, filed on Jul. 31, 2007, in the US PTO, and Korean Patent Application No. 10-2007-0093256, filed on Sep. 13, 2007 in the Korean Intellectual Property Office, the disclosures of which are incorporated herein in their entirety by reference.

BACKGROUND OF THE INVENTION

1. Field of the Invention

Methods and apparatuses consistent with the present invention relate to processing digital content, and more particularly, to preventing unauthorized use of digital content.

2. Description of the Related Art

Recently, a technique of receiving and storing broadcast contents, and various personal video recording/digital video recording (PVR/DVR) systems for supporting the technique have been developed.

Once content that contains copy control information is stored in a device, the content may be prevented from being copied to another device or via a digital interface. That is, if the content, whose copy control information represents "copy once" indicating that copying is permitted only once, is stored in a storage device, the copy control information is changed to represent "copy no more" indicating that further copying is not permitted. Thus, the content cannot be copied to other storage devices but can be moved. Hereinafter, "moving" means that the content is removed from the original storage device in which the content was originally stored when the content is copied to another storage device. Thus, when the content is moved to another storage device, reproduction of the content in the other storage devices including the original storage device is not allowed.

However, even if the content is moved from the original storage device, it is possible to reproduce the content by copying the content of the original storage device on a bit-by-bit basis in order to back up content of the original storage device and then reproducing the content by using the backed up content. Thus, the content can be distributed without permission. Such an attack is referred to as a "disk cloning attack".

Accordingly, when content, which is not permitted to be copied, is moved from a storage device to a new storage device, a new content management mechanism guaranteeing that the content cannot be reproduced in other storage devices except the new storage device is needed.

SUMMARY OF THE INVENTION

Exemplary embodiments of the present invention overcome the above disadvantages and other disadvantages not described above. Also, the present invention is not required to overcome the disadvantages described above, and an exemplary embodiment of the present invention may not overcome any of the problems described above.

The present invention provides an apparatus and method for preventing content, which is not permitted to be copied, from being simultaneously reproduced in two or more additional storage devices.

According to an aspect of the present invention, there is provided a method of allowing a security apparatus which restricts use of content to process contents, the method including generating a nonce with respect to each of storage devices connected to the security apparatus, and storing each nonce in both a predetermined memory separated from the storage devices, and the corresponding storage device; when content is moved from a storage device storing the content, updating the nonce of the storage device, which is stored in the memory, and the nonce stored in the storage device to a same value; and when use of at least one of contents stored in the storage devices is requested, selectively permitting use of the requested content, depending on whether the nonce stored in the storage device storing the requested content is equal to the nonce of the storage device, which is stored in the memory.

The method may further include encrypting the contents by using content keys; respectively encrypting the content keys by using device keys of the storage devices in which corresponding content is to be stored; storing the encrypted contents and content keys in the corresponding storage devices; encrypting the device keys of the storage devices by using a device key of the security apparatus; and storing the encrypted device keys in the memory, wherein the memory is installed in the security apparatus.

The method may further include encrypting the contents by using the content keys; respectively encrypting the content keys by using device keys of the storage devices in which corresponding content is to be stored; storing the encrypted contents and content keys in the corresponding storage devices; and storing the device keys of the storage devices in a predetermined portable device that is detachable from the security apparatus, wherein the memory is installed in the portable device, and the device keys of the storage devices are encrypted by the portable device and stored in the memory.

The storing of the nonce may include encrypting the nonce by using a device key of the corresponding storage device and storing the encrypted nonce in the memory.

During the storing of the nonce in the corresponding storage device and the storing of the encrypted content keys in the corresponding storage devices, the nonce and the encrypted contents may be recorded in content key files bound to the corresponding contents, wherein the content key files comprise a message authentication code (MAC) or a signature value for performing integrity checking.

When the nonce contained in each of the content key files is updated, the message authentication code (MAC) or the signature value of each of the content key files may be updated based on the updated nonce.

According to another aspect of the present invention, there is provided a computer readable recording medium having recorded thereon a computer program for executing the content processing method.

According to another aspect of the present invention, there is provided a security apparatus which restricts use of contents, the apparatus comprising a nonce process unit generating a nonce with respect to each of storage devices connected to the security apparatus, and storing each nonce in both a memory separated from the storage devices, and the storage device; an update unit updating a nonce stored in an original storage device storing content and a nonce of the original storage device, which is stored in the memory, to a same value when the content is moved from the original storage device; and a use restriction unit selectively permitting use of requested content depending on whether the nonce stored in the storage device storing the requested content is equal to the nonce of the storage device, which is stored in the memory, when use of at least one of the contents stored in the storage devices is requested.

BRIEF DESCRIPTION OF THE DRAWINGS

The above and other aspects of the present invention will become more apparent by describing in detail exemplary embodiments thereof with reference to the attached drawings in which:

FIG. 2 is a flowchart illustrating a method of allowing a security apparatus to process content according to an exemplary embodiment of the present invention;

FIG. 3 is a block diagram of a security apparatus according to an exemplary embodiment of the present invention;

FIG. 5 is a flowchart illustrating a method of preventing disk cloning attack according to the present invention.

DETAILED DESCRIPTION OF EXEMPLARY EMBODIMENTS THE INVENTION

Exemplary embodiments of the present invention will now be described more fully with reference to the accompanying drawings. Hereinafter, 'content' will be used to include 'digital content'

Figure 1A:
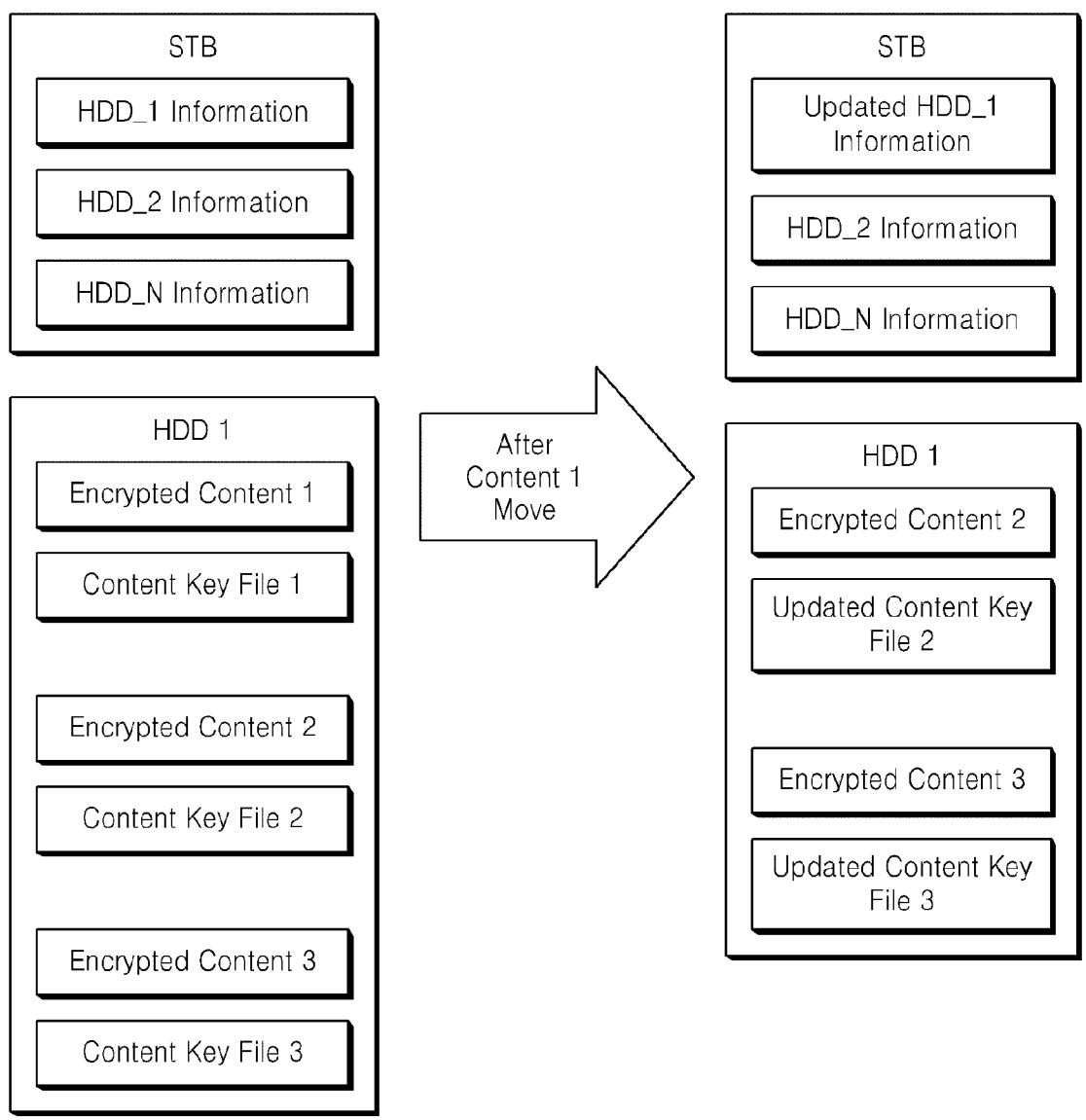
FIG. 1A illustrates a change in data when movement of content occurs according to an exemplary embodiment of the present invention.
Figures 1B, 1C:
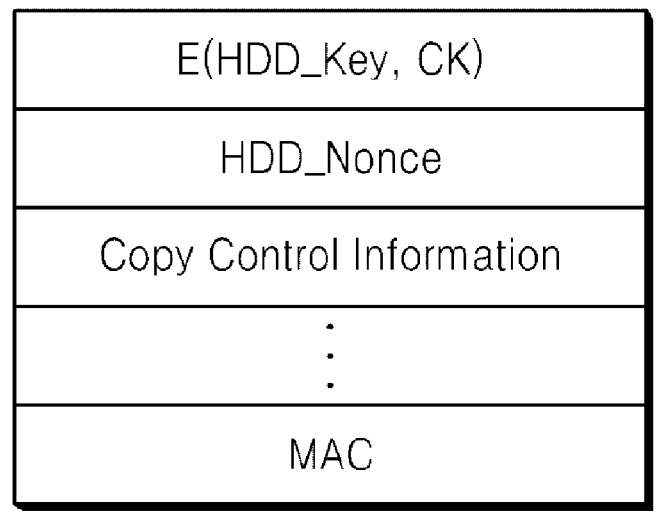
FIG. 1B illustrates the construction of storage information according to an exemplary embodiment of the present invention.
FIG. 1C illustrates the construction of a content key file according to an exemplary embodiment of the present invention.

FIGS. 1A through 1C illustrate a method of storing content according to an exemplary embodiment of the present invention. Here, it is assumed that copying of content 1 is not permitted.

Referring to FIG. 1A, a set-top box STB stores contents in a storage device, e.g., a hard disk drive (HDD), HDD 1 and restricts use of the stored contents. Hereinafter, such a device will be referred to as a security apparatus.

As illustrated in FIG. 1A, the security apparatus stores contents in a plurality of storage devices connected thereto. Information regarding the storage devices (hereinafter referred to as "storage information") is stored in a predetermined memory included in the security apparatus. FIG. 1B illustrates the construction of storage information according to an exemplary embodiment of the present invention.

Referring to FIG. 1B, storage information according to an exemplary embodiment of the present invention includes an identifier HDD_ID and a device key HDD_Key of a storage device, and a nonce HDD_Nonce generated with respect to the storage device. Here, the nonce is a value for each storage device, which is generated by a security apparatus. A nonce of one storage device is generated in such a manner that it does not have a previously used value even if updating is performed later. Also, as illustrated in FIG. 1B, the device key HDD_Key of the storage device, and the nonce HDD_Nonce are preferably stored after being encrypted using a device key MK of the security apparatus.

The security apparatus respectively generates content key files for all contents, and stores the content key files so as to be bound to the corresponding contents. Thus, if content is moved from the original storage device to another storage device, not only the content but also the content key file of the content is deleted from the original storage device. FIG. 1C illustrates the construction of a content key file according to an exemplary embodiment of the present invention.

As illustrated in FIG. 1C, the content key file contains an encrypted content key, a nonce of a storage device storing content, copy control information, and a message authentication code (MAC). A signature value may be used in place of the MAC. The content key is encrypted using a device key of the storage device storing the content. Since it is assumed that copying of the content 1 is prohibited, copy control information of the content 1 represents 'copy no more'.

As illustrated in the right diagram of FIG. 1A, if the content 1 stored in the storage device HDD 1 is moved from the storage device HDD 1 and thus the content 1 and a content key file 1 thereof are deleted from the storage device HDD 1, the security apparatus updates storage information regarding the storage device HDD 1 and the other content key files stored in the storage device HDD 1.

More specifically, the nonce HDD_Nonce contained in the storage information regarding the storage device HDD 1, and the nonces HDD_Nonce of the other content key files stored in the storage device HDD 1 are updated to the same value. The MACs or the signature values of the other content key files are also updated based on the updated nonces HDD_Nonce. As described above, the updated nonces HDD_Nonce must not be equal to previously used values, and this fact would be obvious to those of ordinary skill in the art when considering the meaning of the term "nonce".

The security apparatus according to an exemplary embodiment of the present invention restricts use of contents stored in a plurality of storage devices that the security apparatus manages. In this case, the nonces HDD_Nonce are used. That is, the security apparatus permits use of requested content only when a nonce contained in a content key file of the content is equal to a nonce contained in storage information of the storage device that stores the content. Accordingly, the security apparatus prevents the disk cloning attack.

For example, even if an attacker copies the storage device HDD 1 illustrated in the left diagram of FIG. 1A according to a disk cloning method and then requests the content 1 to be reproduced by connecting the copied storage device to the security apparatus after movement of the content 1, the security apparatus does not permit the attacker to use the content 1. This is because the nonce HDD_Nonce contained in the storage information of the storage device HDD 1 is updated after the movement of the content 1 and thus has a different value from the nonce HDD_Nonce contained in the content key file 1 of the copied storage device.

The nonces HDD_Nonce of the other content key files stored in the storage device HDD 1 are updated to be identical to the nonce HDD_Nonce in the storage information in the storage device HDD 1. Therefore, reproducibility of the other contents does not be affected by the movement of the content 1.

FIG. 2 is a flowchart illustrating a method of allowing a security apparatus to process contents according to an exemplary embodiment of the present invention. Referring to FIG. 2, in operation 210, the security apparatus stores contents received via a broadcast channel in a plurality of storage devices.

In operation 220, the security apparatus generates a nonce of each of the storage devices.

In operation 230, the security apparatus stores the nonces in a memory thereof and the corresponding storage devices. That is, an initial value of the nonce of each of the storage devices, which is stored in the corresponding storage device, is equal to that of the nonce stored in the security apparatus.

Each of the nonces stored in the security apparatus is contained in storage information, and the nonce stored in each of the storage devices is contained in a content key file.

In operation 240, when content is moved from the original storage device to the outside, the nonce of the original storage device, which is stored in the security apparatus, and the nonce stored in the original storage device are updated to the same value. That is, the storage information regarding the original storage device and a plurality of content key files stored in the original storage device are updated.

In operation 250, the security apparatus receives a request to use at least one from among the contents stored in the storage devices.

In operation 260, the security apparatus determines whether to permit the request, based on the nonce of the storage device storing the requested content. That is, the security apparatus determines whether the nonce of the storage device, which is stored in the security apparatus, is equal to the nonce stored in the storage device. Thus, the storage information of the storage device and the content key file of the requested content are analyzed.

If it is determined in operation 260 that the nonce representing the storage device, which is stored in the security apparatus, is equal to the nonce stored in the storage device, the security apparatus permits the request in operation 270. If it is determined in operation 260 that the nonce of the storage device, which is stored in the security apparatus, is not equal to the nonce stored in the storage device, the security apparatus rejects the request.

FIG. 3 is a block diagram of a security apparatus 300 that can restrict use of content according to an exemplary embodiment of the present invention. Referring to FIG. 3, the security apparatus 300 includes a content key generation unit 301, a first encryption unit 302, a second encryption unit 303, a content storing control unit 304, a memory 305, a third encryption unit 307, a nonce process unit 308, an update unit 309, a use restriction unit 310, and a storage interface 311.

The content key generation unit 301 generates a plurality of content keys for encrypting contents that are to be stored in a plurality of storage devices.

The first encryption unit 302 respectively encrypts the contents by using the corresponding content keys.

The second encryption unit 303 encrypts the content keys by using device keys of the respective storage devices.

The content storing control unit 304 stores the encrypted contents and content keys in the storage devices. In this case, each of the encrypted content keys is recorded in a content key file of the corresponding content, and the content key file is stored so as to be bound to the content.

The third encryption unit 307 encrypts the device keys of the storage devices by using a device key of the security apparatus 300 and stores the encrypted device keys in the memory 305. In this case, the encrypted device keys are recorded in storage information.

The nonce process unit 308 generates a nonce of each of the storage devices and stores the nonces in the memory 305 and the respective storage devices. In this case, the nonce stored in each of the storage devices is recorded in all the content key files stored in the storage device, and the nonce stored in the memory 305 is recorded in storage information of the storage device. When storing the nonce in the memory 305, the nonce is preferably stored after being encrypted using the device key of the security apparatus 300.

Each of the content key files may contain the encrypted device key of the storage device, the nonce of the storage device, content identification (ID), and copy control information of the content. Each of the content key files preferably further includes an MAC or a security value for integrity checking the content key file.

If the content stored in one of the storage devices is moved to the outside (in this case, a content key file bound to the content is also moved together with the content), the update unit 309 updates both the nonce stored in the memory 305 and the nonce stored in the storage device to the same value. That is, the storage information of the storage device, which is stored in the memory 305, and the other content key files stored in the storage device are updated. If the content key files are updated, the MAC or the security value stored in each of the content key files is calculated again based on the updated nonce.

The use restriction unit 310 selectively restricts use of the contents stored in the storage devices, based on the nonces stored in the memory 305 and the storage devices. That is, when a request to use one of the contents is received, the content key file of the content and the storage information of the storage device storing the content are analyzed. If the nonce contained in the content key file is equal to the nonce contained in the storage information, the request to use the content is granted. If the nonce contained in the content key file is not equal to the nonce contained in the storage information, the request to use the content is not granted.

The storage interface 311 enables communication to be established among the security apparatus 300 and the storage devices.

Figure 4A:
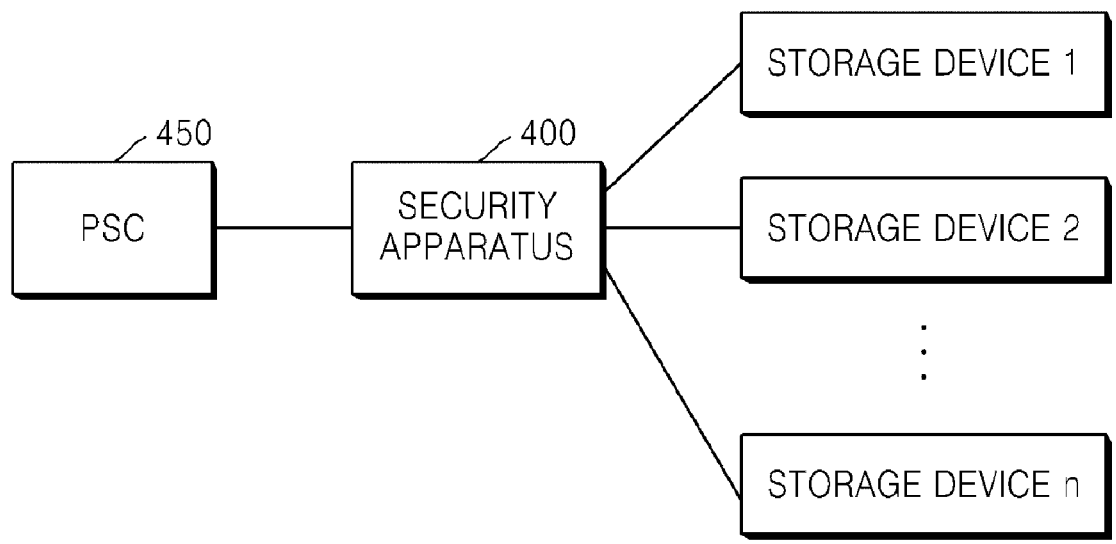
FIGS. 4A and 4B are block diagrams of a security apparatus according to another exemplary embodiment of the present invention.
Figure 4B:
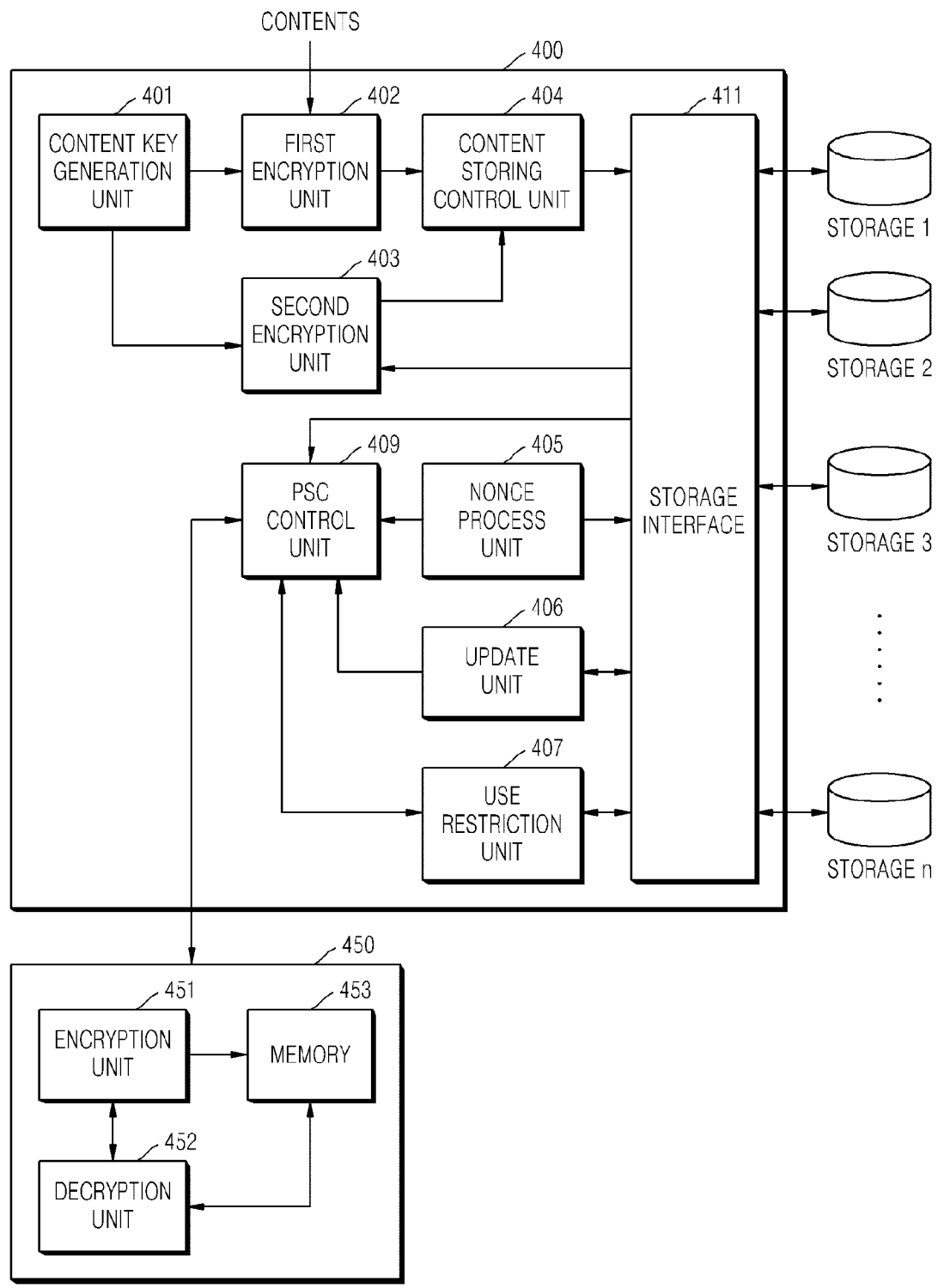

FIGS. 4A and 4B are block diagrams of a security apparatus 400 according to another exemplary embodiment of the present invention.

The security apparatus 300 illustrated in FIG. 3 encrypts a device key and a nonce of a storage device by using its device key, records the encrypted device key and nonce in storage information and stores the storage information in the storage device. That is, the encrypted device key and nonce are stored in the memory 305.

However, in such an environment, both a storage device, and a security apparatus that stores storage information of the storage device are needed to use content stored in the storage device. This is because permission to use the content must be received from the security apparatus in order to use the content, and the nonce stored in the storage information of the storage device must be referred to for the security apparatus to determine whether to permit use of the content. Thus, even if a user connects the storage device to another security apparatus while moving, the content stored in the storage device cannot be reproduced.

In the current exemplary embodiment of the present invention, storage information is stored in an additional portable device 450 separated from the security apparatus 400 in order to solve this problem. Hereinafter, a portable device, such as the portable device 450, is referred to as a "portable security component" (PSC).

FIG. 4B illustrates the constructions of the security device 400 and the PSC 450 in detail. A description of elements of the security apparatus 400 having the same operations as those of the security apparatus 300 illustrated in FIG. 3 will be omitted.

As illustrated in FIG. 4B, unlike the security apparatus 300, the security apparatus 400 does not include a memory that stores storage information but includes a PSC control unit 409. A memory 453 that stores storage information is installed in a PSC 450.

Nonces of respective storage devices, which are generated by a nonce process unit 404, are transmitted to the PCT control unit 409, and the PCT control unit 409 transmits the nonces to the PSC 440. Also, the PSC controller 409 delivers the device keys of the storage devices to the PSC 450.

An encryption unit 451 of the PSC 450 generates storage information by encrypting the received nonces and device keys of the storage devices, and stores the encrypted storage information in the memory 453 in the PSC 450.

When movement of content occurs, the update unit 406 informs the PSC 450 of information, e.g., a storage device ID, regarding a storage device that stores the content, and an updated nonce of the storage device, and the PSC 450 updates the storage information stored in the memory 453 by using the updated nonce.

If receiving a request to use content, the use restriction unit 407 requests the PSC 450 to provide the nonce of the storage device that stores the content. A decryption unit 452 of the PSC 450 decrypts the nonce stored in the storage information of the storage device and provides the decrypting result to the PSC control unit 409, and the PSC control unit 409 transmits the decrypting result to the use restriction unit 407. The use restriction unit 407 compares the nonce received from the PSC control unit 409 with the nonce contained in the content key file of the content, and then determines whether to permit the request to use the content.

FIG. 5 is a flowchart illustrating a method of preventing the disk cloning attack according to an exemplary embodiment of the present invention.

In the present exemplary embodiment, it is assumed that a security apparatus is connected to a PSC and the PSC stores storage information as described above with reference to FIG. 4.

Referring to FIG. 5, in operation 501, the security apparatus generates a nonce representing a storage device A, and stores contents and the nonce of the storage device A in the storage device A.

In operation 502, the security apparatus provides the nonce of the storage device A to the PSC.

In operation 503, the PSC generates storage information of the storage device A by encrypting the nonce of the storage device A by using a device key of the PSC.

In operation 504, content C stored in the storage device A is moved to the outside. Before the movement of the content C, an attacker makes a storage device A' by copying the storage device A on a bit by bit basis.

In operation 505, the security apparatus updates content key files stored in the storage device A since the movement of the content C occurs. That is, the security apparatus updates the nonce stored in the storage device A.

In operation 506, an MAC or a signature value of the content key files is updated since the nonce contained in the content key files is updated.

In operation 507, the security apparatus informs the PSC of the updated nonce.

In operation 508, the PSC updates the storage information of the storage device A by using the updated nonce received from the security apparatus.

In operation 509, the security apparatus receives a request to reproduce the content C from the storage device A'. In FIG. 5, a dotted line denotes that a storage device is disconnected from the security apparatus and a solid line denotes that a storage device is connected to the security apparatus.

That is, the storage device A is disconnected from the security apparatus, and the request to use the content C is transmitted to the security apparatus while the storage device A' is connected to the security apparatus. The storage device A' is obtained by disk cloning the storage device A prior to the movement of the content C, and thus, the security apparatus recognizes the storage device A' as the storage device A.

In operation 510, the security apparatus requests the storage device A' to transmit the content key files of the content C and receives the content files. In this case, the received content key files are the same as those of the content C before the movement of the content C.

In operation 511, the security apparatus requests the PSC to transmit the nonce of the storage device A.

In operation 512, the PSC decrypts the nonce of the storage device A from the storage information of the storage device A by using the device key of the PSC. In this case, the decrypted nonce is not identical to the nonce provided to the PSC in operation 502 but is the updated nonce that the PSC is informed about in operation 507.

In operation 513, the PSC transmits the nonce of the storage device A to the security apparatus.

In operation 514, the security apparatus compares the nonce contained in the content key files received in operation 510 with the nonce received from the PSC in operation 513. The nonce received from the PSC has been updated and the nonce stored in the storage device A' has yet to be updated, and therefore, they are not identical to each other.

In operation 515, the security apparatus informs the attacker that reproduction of the content C has failed.

The aforementioned exemplary embodiments of the present invention can be embodied as a computer program that can be run by a computer. When the program is read and run by a general digital computer via a computer readable medium, the above exemplary embodiments can be performed.

The computer readable medium may be a magnetic recording medium (a ROM, a floppy disk, a hard disc, etc.), an optical recording medium (a CD-ROM, a DVD, etc.), or a carrier wave that transmits data via the Internet, for example.

According to the exemplary embodiments of the present invention, even if disk cloning is performed on a storage device storing content which is not permitted to be copied, the content cannot be reproduced even by using the cloned storage device once the content is moved from the original storage device. Therefore, it is possible to prevent the content from being illegally used despite the presence of copy control information.

While this invention has been particularly shown and described with reference to exemplary embodiments thereof, it will be understood by those of ordinary skill in the art that various changes in form and details may be made therein without departing from the spirit and scope of the invention as defined by the appended claims.

What is claimed is:

1. A method of allowing a security apparatus which restricts use of content to process contents, the method comprising:

generating a nonce of a storage device connected to the security apparatus, the generated nonce having a first value;

storing the nonce in a memory separated from the storage device;

generating a first content key file of first content stored in the storage device, the first content key file comprising the nonce and a first content key of the first content that permits access to the first content;

generating a second content key file of second content stored in the storage device, the second content key file comprising the nonce and a second content key of the second content that permits access to the second content;

storing the first content key file and the second content key file in the storage device, the first content key file bound to the first content such that both the first content and the first content key file are deleted from the storage device in response to moving the first content from the storage device to a second storage device;

if first content is moved from the storage device to the second storage device, updating the nonce stored in the memory from the first value to a second value and updating the nonce stored in the second content key file from the first value to the second value; and if use of the second content stored in the storage device is requested, determining that the second value of the nonce stored in the memory is equal to the second value of the nonce stored in the second content key file and permitting the requested use of the second content in response to determining the second value of the nonce stored in the memory is equal to the second value of the nonce stored in the second content key file.

2. The method of claim 1, further comprising:

encrypting the second content by using the second content key;

encrypting the second content key by using a device key of the storage device in which the second content is stored;

storing the encrypted second content in the storage device and the encrypted second content key in the second content key file;

encrypting the device key of the storage device by using a device key of the security apparatus; and storing the encrypted device key of the storage device in the memory, wherein the memory is installed in the security apparatus.

3. The method of claim 1, further comprising:

encrypting the second content by using the second content key;

encrypting the second content key by using a device keys of the storage device in which the second content is stored;

storing the encrypted second content in the storage device and the encrypted second content key in the second content key file; and storing the device key of the storage device in a predetermined portable device that is detachable from the security apparatus, wherein the memory is installed in the portable device, and the device key of the storage device is encrypted by the portable device and stored in the memory.

4. The method of claim 1, wherein the storing the nonce in the memory comprises:

encrypting the nonce by using a device key of the storage device; and storing the encrypted nonce in the memory.

5. The method of claim 2, wherein the second content key file comprises a message authentication code or a signature value for performing integrity checking.

6. The method of claim 5, wherein when the nonce of the storage device stored in the second content key file is updated from the first value to the second value, the message authentication code or the signature value is updated based on the second value of the updated nonce.

7. A non-transitory computer readable recording medium having recorded thereon a computer program that causes a computer to execute a method of allowing a security apparatus which restricts use of content to process contents, the method comprising:

generating a nonce of a storage device connected to the security apparatus, the generated nonce having a first value;

storing the nonce in a memory separated from the storage device;

generating a first content key file of first content stored in the storage device, the first content key file comprising the nonce and a first content key of the content that permits access to the first content;

generating a second content key file of second content stored in the storage device, the second content key file comprising the nonce and a second content key of the content that permits access to the second content;

storing the first content key file and the second in the storage device, the first content key file bound to the first content such that both the first content and the first content key file are deleted from the storage device in response to moving the first content from the storage device to a second storage device;

if first content is moved from the storage device, updating the nonce stored in the memory from the first value to a second value and updating the nonce stored in the second content key file from the first value to the second value; and if use of the second content stored in the storage device is requested, determining that the second value of the nonce stored in the memory is equal to the second value of the nonce stored in the second content key file and permitting the requested use of the second content in response to determining the second value of the nonce stored in the memory is equal to the second value of the nonce stored in the second content key file.

8. A security apparatus which restricts use of contents, the apparatus comprising:

a nonce process unit which generates a nonce of a storage device connected to the security apparatus, the generated nonce having a first value, and stores the nonce in a memory separated from the storage device, in a first content key file of first content stored in the storage device, and in a second content key file of second content stored in the storage device, the first content key file comprising the nonce and a first content key of the first content that permits access to the first content and the second content key file comprising the nonce and a second content key of the second content that permits access to the second content the first content key file and the second content key file stored in the storage device, the first content key file bound to the first content such that both the first content and the first content key file are deleted from the storage device in response to moving the first content from the storage device to a second storage device;

an update unit which updates the nonce stored in the memory from the first value to a second value and updates the nonce stored in the second content key file from the first value to the second value if the first content is moved from the storage device to the second storage device; and a use restriction unit which determines that the second value of the nonce stored in the memory is equal to the second value of the nonce stored in the second content key file and permits use of the second content in response to determining the second value of the nonce stored in the second content key file is equal to the second value of the nonce stored in the memory, in response to receiving a request to use the second content stored in the storage device.

* * * * *